US007901088B2

(12) United States Patent
Nakamura et al.

(10) Patent No.: US 7,901,088 B2
(45) Date of Patent: Mar. 8, 2011

(54) PROJECTION DISPLAY APPARATUS AND IMAGE FORMING APPARATUS WITH EFFICIENT POWER CONSUMPTION

(75) Inventors: Yukio Nakamura, Tokyo (JP); Mitsuhiko Ogihara, Tokyo (JP); Katsuyuki Ito, Tokyo (JP); Takashi Ushikubo, Tokyo (JP)

(73) Assignees: Oki Data Corporation, Tokyo (JP); Oki Electric Industry Co., Ltd., Tokyo (JP)

( * ) Notice: Subject to any disclaimer, the term of this patent is extended or adjusted under 35 U.S.C. 154(b) by 590 days.

(21) Appl. No.: 11/892,732

(22) Filed: Aug. 27, 2007

(65) Prior Publication Data
US 2008/0055555 A1    Mar. 6, 2008

(30) Foreign Application Priority Data
Aug. 30, 2006   (JP) ................. 2006-234483

(51) Int. Cl.
    *G03B 21/16*   (2006.01)
(52) U.S. Cl. .................. 353/94; 353/31; 353/52; 345/55
(58) Field of Classification Search .............. 353/94, 353/31, 52; 345/55
    See application file for complete search history.

(56) References Cited

U.S. PATENT DOCUMENTS

| | | | |
|---|---|---|---|
| 6,323,053 | B1 | 11/2001 | Nishikawa et al. |
| 7,362,388 | B2 | 4/2008 | Hashimoto |
| 2003/0076282 | A1 | 4/2003 | Ikeda et al. |
| 2003/0214691 | A1 | 11/2003 | Magno et al. |
| 2005/0012445 | A1 | 1/2005 | Yamazaki et al. |
| 2005/0243042 | A1 | 11/2005 | Shivji |

FOREIGN PATENT DOCUMENTS

| | | |
|---|---|---|
| CN | 1607457 A | 4/2005 |
| JP | 7-114351 | 5/1995 |
| JP | 7-152327 | 6/1995 |
| JP | 9-230499 | 9/1997 |
| JP | 11-67448 | 3/1999 |
| JP | 2000-66301 | 3/2000 |
| JP | 2001-343935 | 12/2001 |
| JP | 2002-23700 | 1/2002 |
| JP | 2002-369050 | 12/2002 |
| JP | 2003-150109 | 5/2003 |
| JP | 2004-133111 | 4/2004 |
| JP | 2005-121890 | 5/2005 |

OTHER PUBLICATIONS

Stefan Riehemann et al.: "P-69: Miniaturized Projection Systems with OLED Microdisplays—Approaches for Industrial Measurements" May 24, 2005, 2005 SID International Symposium, Boston, MA, May 24-27, 2005; [SID International Symposium], San Jose, CA: SID, US, pp. 547-549, XP007012498.

*Primary Examiner* — Seung C Sohn
(74) *Attorney, Agent, or Firm* — Rabin & Berdo, PC

(57) ABSTRACT

A projection display apparatus includes an image forming section that forms an image based on image information received from an external device, and a projection lens that projects the image formed by the image forming section. The projection display apparatus includes a substrate, a plurality of light emitting elements, a first driver and a second driver. The light emitting elements are two-dimensionally arranged on the substrate. The light emitting elements include rows of light emitting elements and columns of light emitting elements such that the rows are substantially perpendicular to the columns. The first driver element selectively drives the rows. The second driver element selectively drives the columns. The plurality of light emitting elements include three groups of light emitting elements aligned either in the rows or in the columns, each group emitting light of a different wavelength from the remaining groups.

16 Claims, 9 Drawing Sheets

PROJECTION DISPLAY APPARATUS AND IMAGE FORMING APPARATUS WITH EFFICIENT POWER CONSUMPTION

BACKGROUND OF THE INVENTION

1. Field of the Invention

The present invention relates to a projection display apparatus and an image forming apparatus.

2. Description of the Related Art

A conventional projection display apparatus includes a light source, a light modulating device, and a projection lens. The light source takes the form of, for example, light emitting diodes (LEDs) or a discharge lamp (e.g., halogen lamp). The light modulating device takes the form of a liquid crystal panel or a digital micro mirror device in which light is reflected by individual pixels in specific directions. The liquid crystal panel includes a number of pixels each of which is driven or modulated in accordance with an image signal to transmit or block the light emitted from the light source. The projection lens projects the modulated light signals onto a screen.

A conventional projection display apparatus requires a light source that emits light at all times. Energizing a light source at all times consumes a large amount of electric power and therefore generates a large amount of heat.

SUMMARY OF THE INVENTION

The present invention was made in view of the aforementioned problems.

An object of the invention is to provide a small projection display apparatus that consumes less electric power.

A projection display apparatus includes an image forming section that forms an image based on image information received from an external device, and a projection lens that projects the image formed by the image forming section. The image forming section includes a substrate, a plurality of light emitting elements, a first driver element, and a second driver element. The plurality of light emitting elements are two-dimensionally arranged on the substrate. The plurality of light emitting elements include rows of light emitting elements and columns of light emitting elements such that the rows are substantially perpendicular to the columns. The first driver element selectively drives the rows. The second driver element selectively drives the columns.

The image forming section includes a cooling section that cools the plurality of light emitting elements.

The plurality of light emitting elements include three groups of light emitting elements aligned either in the rows or in the columns, each group emitting light of a different wavelength from the remaining groups.

The image forming section is one of a plurality of image forming sections, each image forming section including a plurality of light emitting elements that emit light of the substantially the same wavelength such that each image forming section forms an image of a different wavelength from remaining ones of the plurality of image forming sections. The projection display apparatus further comprises an image synthesizing section that combines images formed by the plurality of image forming sections into a single image.

The projection display apparatus further includes a screen that includes a front surface and a rear surface. The projection lens projects the image onto the rear surface and an observer observes the image formed on the front surface.

The plurality of light emitting elements are light emitting diodes formed in the form of semiconductor thin films of stacked structure, each semiconductor thin film including a number of light emitting diodes isolated from one another, the semiconductor thin films being bonded to the substrate by intermolecular force.

The substrate includes an insulating film formed on a surface thereof, the insulating film forming a smoothed surface onto which the semiconductor thin films are bonded.

The projection display apparatus further includes an image pickup device and a light-path switching section. The light-path switching section directs the image formed in the image forming section to the projection lens and that directs an image entering through the projection lens from outside of the apparatus to the image pickup device.

An image forming apparatus incorporated in the aforementioned projection display apparatus. The image forming apparatus includes a substrate, a plurality of semiconductor thin films, a first driver element, and a second driver element.

Each of the plurality of semiconductor thin films includes a predetermined number of light emitting diodes isolated from one another, the plurality of semiconductor thin films being bonded by intermolecular force over the substrate such that the light emitting diodes are two-dimensionally arranged. The plurality of light emitting diodes include rows of light emitting diodes and columns of light emitting diodes such that the rows are substantially perpendicular to the columns. The first driver element selectively drives the rows. The second driver element selectively drives the columns.

The substrate includes an insulating film formed on a surface thereof, the insulating film forming a smoothed surface onto which the semiconductor thin films are bonded.

The plurality of semiconductor thin films include a plurality of groups of semiconductor thin films, each group including light emitting diodes that emit light of a wavelength different from the remaining groups. Adjacent groups emit light of different wavelengths from one another.

The plurality of semiconductor thin films are first formed on a base with an sacrificial layer formed between the base and the plurality of semiconductor thin films, and then the sacrificial layer is etched away so that the plurality of semiconductor thin films are separated from the base and are then bonded to the substrate.

An image forming apparatus includes a substrate, a plurality of semiconductor thin films, a first driver element, and a second driver element. Each of the plurality of semiconductor thin films includes a predetermined number of light emitting diodes isolated from one another, the plurality of semiconductor thin films being bonded by intermolecular force over a surface of the substrate such that the light emitting diodes are two-dimensionally arranged. The plurality of light emitting elements include rows of light emitting elements and columns of light emitting elements such that the rows are substantially perpendicular to the columns. The first driver element selectively drives the rows. The second driver element selectively drives the columns.

The substrate includes an insulating film formed on a surface thereof, the insulating film forming a smoothed surface onto which the semiconductor thin films are bonded.

The plurality of semiconductor thin films include a plurality of groups of semiconductor thin films, each group emitting light of a wavelength different from the remaining groups. Adjacent groups of semiconductor thin films emit light of different wavelengths from one another.

The plurality of semiconductor thin films are first formed on a base with an sacrificial layer formed between the base and the plurality of semiconductor thin films, and then the sacrificial layer is etched away so that the plurality of semiconductor thin films are separated from the base and are then bonded to the substrate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DETAILED DESCRIPTION OF THE INVENTION

First Embodiment

Figure 1:
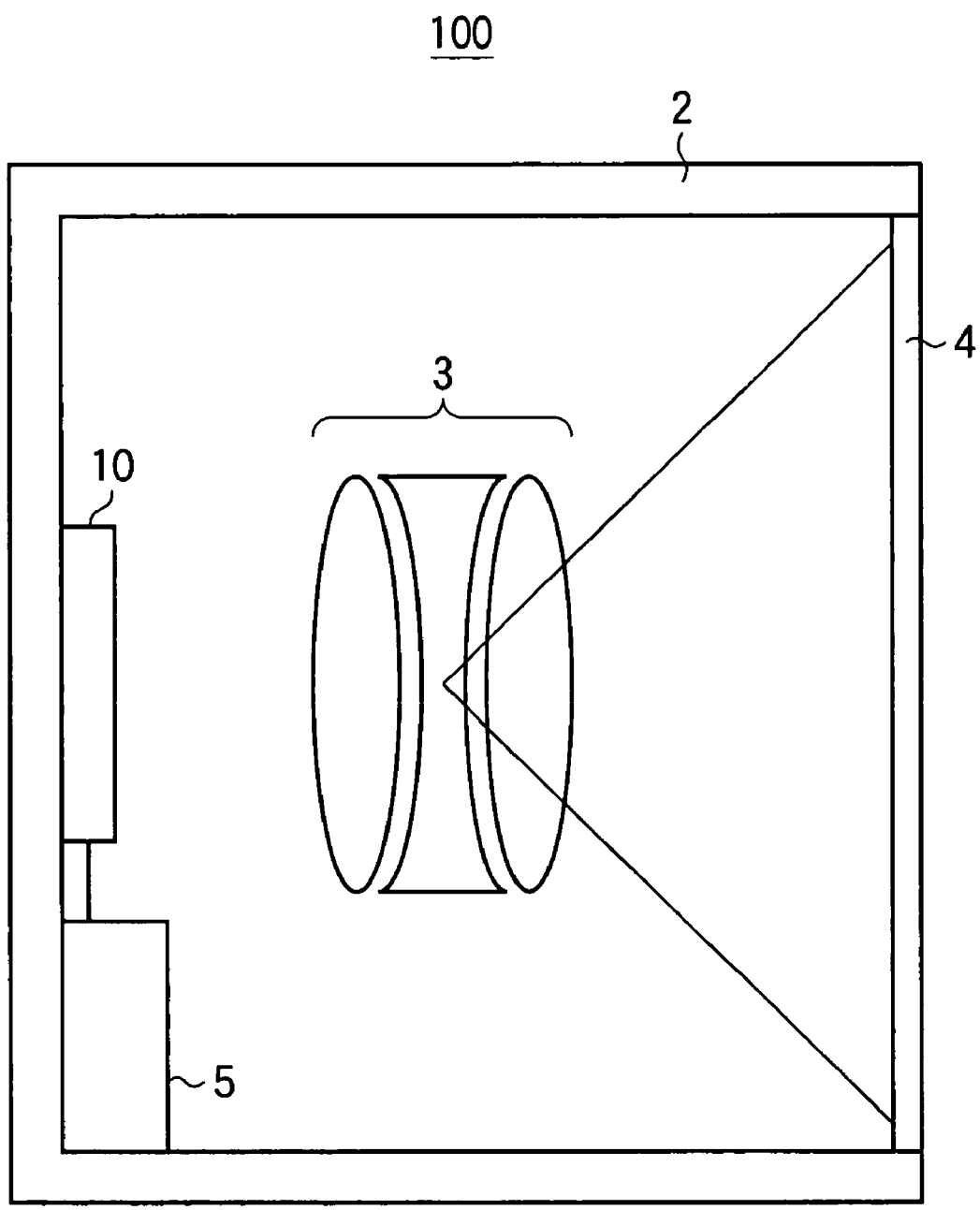
FIG. 1 illustrates the configuration of a projection display apparatus of a first embodiment.

FIG. 1 illustrates the configuration of a projection display apparatus 100 of a first embodiment.

A chassis 2 is formed of an opaque material that prevents light from leaking out of the projection display apparatus 100 and ambient light from leaking from the outside into the projection display apparatus 100.

A controller 5 receives an analog image signal, and converts the analog image signal into a digital image signal that may form a visible image on the LED array panel 10.

A light emitting diode (LED) array panel 10 serves as an image forming section. The LED array panel 10 forms an image in accordance with the digital image signal produced in the controller 5.

A projection lens 3 projects the image formed by the LED array panel 10 onto a screen 4. The screen 4 is of a construction where the image is projected onto one side of the screen 4 and is observed by observers from the other side of the screen 4.

Figure 2:
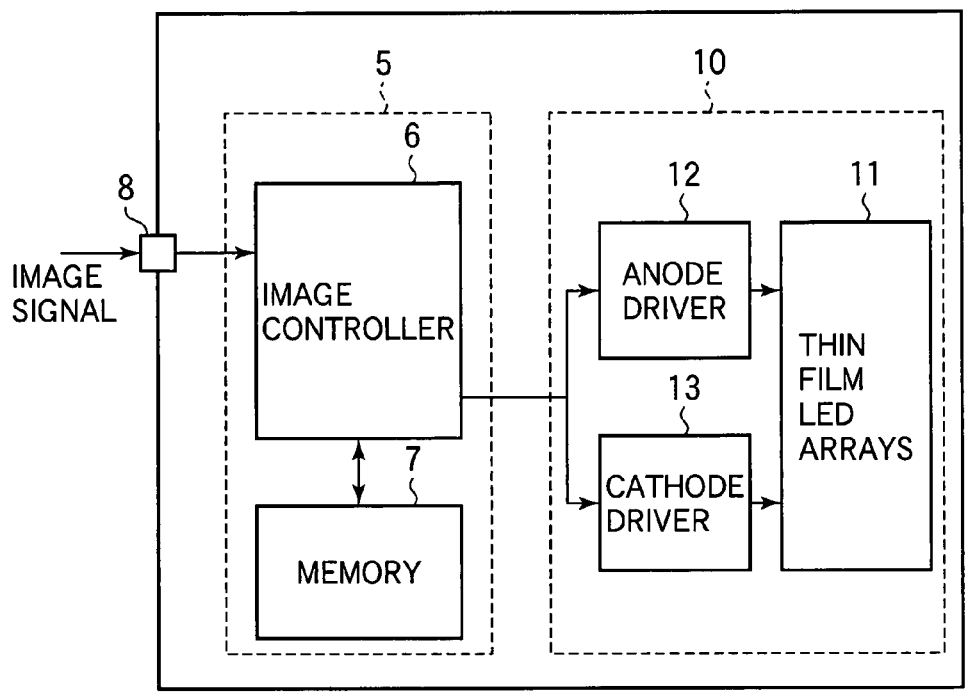
FIG. 2 is a block diagram illustrating the function of a projection display apparatus.

FIG. 2 is a block diagram illustrating the functions of the respective blocks of a projection display apparatus 100. An image receiving section 8 is a port through which the analog image signal is received from an external apparatus (e.g., an apparatus such as a DVD player that reproduces moving images).

The controller 5 includes an image controller 6 and a memory 7. The image controller 6 converts an analog image signal received through the image receiving section 8 into a digital image signal such that the LED array panel 10 can form a visible image on the LED array panel 10. The image controller 6 then outputs the digital image signal together with control signals to the memory 7. The memory 7 stores the digital image signal.

The LED array panel 10 includes an anode driver 12, a cathode driver 13, and a plurality of thin film LED arrays 11. The anode driver 12 and cathode driver 13 drive the respective LEDs in accordance with an image signal converted by the image controller 6. Each of the plurality of thin film LED arrays 11 includes a plurality of LEDs formed in the form of a thin film.

The anode driver 12 is connected to the thin film LED arrays, and supplies current to the LEDs in the thin film LED arrays 11 in accordance with the digital image signal received from the image controller 6. The anode driver 12 includes, for example, shift registers, latching circuits, constant current circuits, and driver transistors.

The cathode driver 13 scans the LEDs in the thin film LED arrays 11 in accordance with the control signal received from the controller 6. The cathode driver 13 is configured with, for example, selector circuits.

Figure 3:
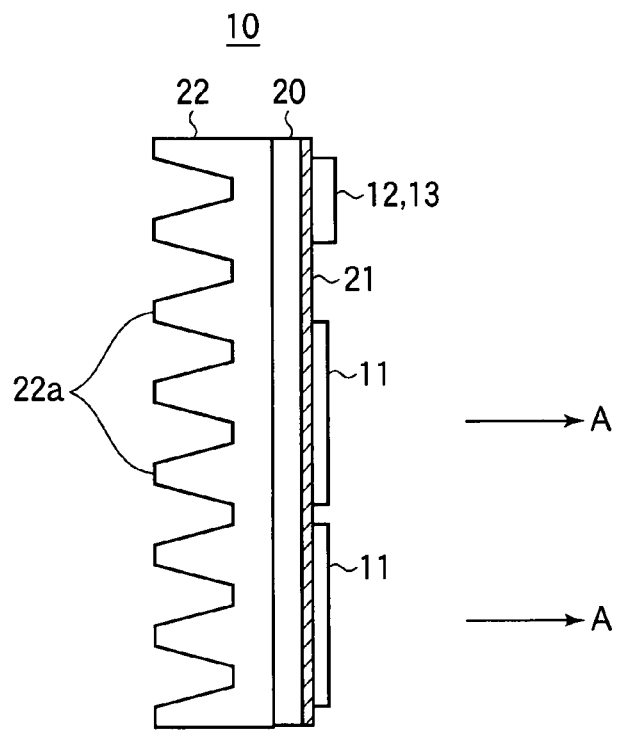
FIG. 3 is a cross section illustrating the construction of the LED array panel.

FIG. 3 is a cross-sectional view illustrating the construction of the LED array panel 10.

A substrate 20 is a base on which the anode driver 12, cathode driver 13, thin film LED arrays 11, and remaining components are mounted. The substrate 20 is formed of a material such as silicon, quartz, glass, or ceramic. The substrate 20 includes a surface on which an insulating film 21 is formed. The insulating film 21 is made of an organic material (e.g., polyimide) or an inorganic material, and has a surface smoothed to a surface roughness of less than 100 nm. The insulating film 21 supports the aforementioned various circuits and components mounted thereon.

A heat sink 22 dissipates heat generated by the thin film LED arrays 11, anode driver 12, and cathode driver 13. The heat sink 22 is of a shape having fins 22a, but may be of another shape depending on the amount of heat to be dissipated. Still alternatively, the heat sink 22 may be replaced by an apparatus such as a water-cooled type or a heat pipe type depending on the amount of generated heat.

When the thin film LED arrays 11 is driven by the anode driver 12 and cathode driver 13 to emit light in a direction shown by arrow A, substantially normal to the surface of the substrate 20 on which the various circuits and components are mounted.

Figure 4:
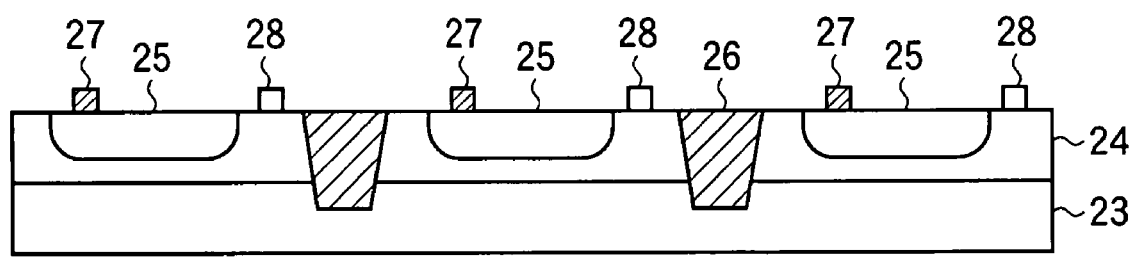
FIG. 4 is a cross-sectional view illustrating the construction of the thin film LED array.

FIG. 4 is a cross-sectional view illustrating the construction of the thin film LED array 11.

The thin film LED arrays 11 include three types of arrays depending on the wavelength of emitted light: red LED arrays 11-R (wavelength in the range of 620-710 nm), green LED arrays 11-G (wavelength in the range of 500-580 nm), and blue LED arrays 11-B (wavelength in the range of 450-500 nm). The LED arrays 11-R, 11-G, and 11-B may be substantially identical except for their wavelength. For simplicity only, the configuration of the red LED array 11-R will be described.

A semiconductor layer 23 is a semi-insulating layer or a non-doped layer of GaAs.

An n-type semiconductor layer 24 is formed of AlGaAs doped with an n-type impurity.

A p-type semiconductor region 25 is formed by diffusing a p-type impurity (e.g., Zn) into the surface of the n-type semiconductor layer 24. A pn junction is formed at the boundary between the n-type semiconductor layer 24 and the p-type semiconductor region 25, functioning as a light emitting diode.

An isolation region 26 is formed by etching to electrically isolate adjacent p-type semiconductor regions 25. The isolation region 26 is a groove formed into the n-type semiconductor layer 24 by etching, making a cut through the n-type semiconductor layer 24 until the isolation region 26 reaches the semiconductor layer 23. The groove may be filled with an insulating material to provide a smooth surface.

A p-type side electrode 27 is formed on a corresponding p-type semiconductor region 25, making electrical connection with the p-type semiconductor region 25.

An n-type side electrode 28 is formed on a corresponding n-type semiconductor region 24, making electrical connection with the n-type semiconductor region 24.

As described above, the thin film LED array 11-R employs a layer of AlGaAs. A layer of AlGaInP or GaP may be employed for the green LED array. A layer of GaN or InGaN may be employed for the blue LED array.

The semiconductor layer in which LEDs are formed is preferably either a single heterostructure or a double heterostructure.

FIGS. 5A-5F illustrate the steps for manufacturing the thin film red LED array 11-R.

Figure 5A:
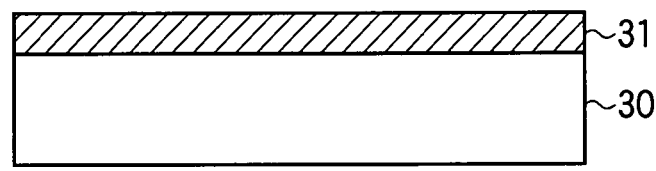
FIGS. 5A-5F illustrate the steps for manufacturing the thin film red LED array.

(1) A sacrificial layer 31 is formed of AlAs on a base 30 of GaAs (FIG. 5A). It is to be noted that the base 30 is a separate structure from the substrate 20.

Figure 5B:
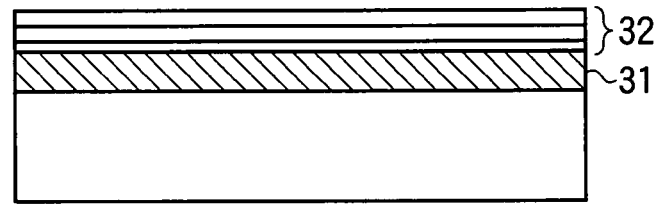

(2) A stacked semiconductor thin film 32 is formed of, for example, AlGaAs on the sacrificial layer 31, being epitaxially grown by vapor phase growth such as MOCVD (FIG. 5B).

Figure 5C:
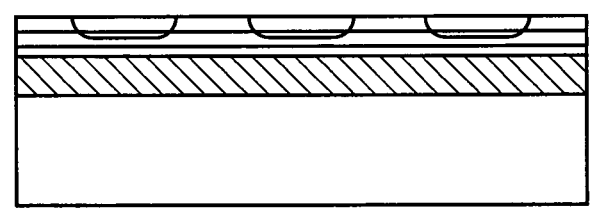

(3) A plurality of pn junctions are formed in the stacked semiconductor thin film 32, thereby forming a plurality of LEDs (FIG. 5C).

Figure 5D:
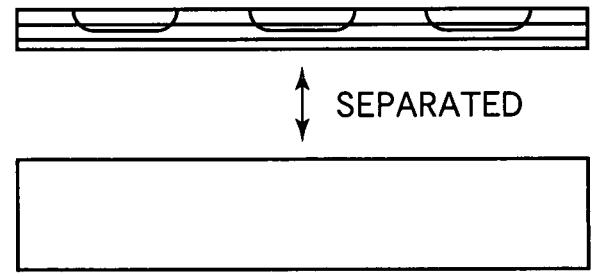

(4) Portions of the stacked semiconductor thin film 32 are then etched away using a photolithographic etching technique, leaving rectangular areas such that a predetermined number of light-emitting regions (e.g., FIG. 5C shows only three regions by way of example) are within the perimeter of the rectangular area. The etching solution is, for example, a mixed-solution of phosphoric acid and oxygenated water. The light-emitting region corresponds to the p-type semiconductor region 25 of FIG. 4, and is about 20 μm square. Then, the entire structure of FIG. 5C is immersed in a chemical etching solution adapted to etch the sacrificial layer, such as an aqueous solution of hydrochloric acid or an aqueous solution of hydrogen fluoride, so that the sacrificial layer 31 is etched away to separate the semiconductor thin film 32 from the base 30 (FIG. 5D).

Figure 5E:
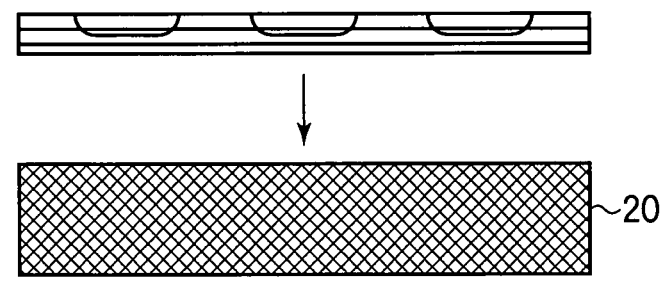
Figure 5F:
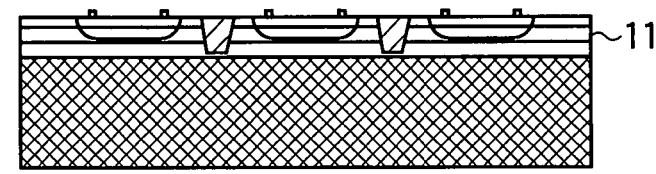

(5) Then, the semiconductor thin film 32 separated from the base 30 is pressed against the insulating film 21 formed on the substrate 20, thereby fixedly mounting the semiconductor thin film 32 on the substrate 20 (FIG. 5E). The insulating film 21 (FIG. 3) formed on the surface of the substrate 20 facilitates bonding of the semiconductor thin film 32 onto the substrate 20 by intermolecular force, typically hydrogen bonding.

(6) The thin film LED array 11 bonded to the substrate 20 is immersed in an etching solution (e.g., mixed-solution of phosphoric acid and oxygenated water) by photolithographic etching, thereby forming the isolation regions 26 that isolate the thin film LED array 11 into individual LED elements. The p-type side electrode 27 and n-type side electrode 28 are formed on the individual LED element by vapor deposition/photolithographic etching or lift-off method, thereby forming the thin film LED array 11-R shown in FIG. 4.

Figure 6:
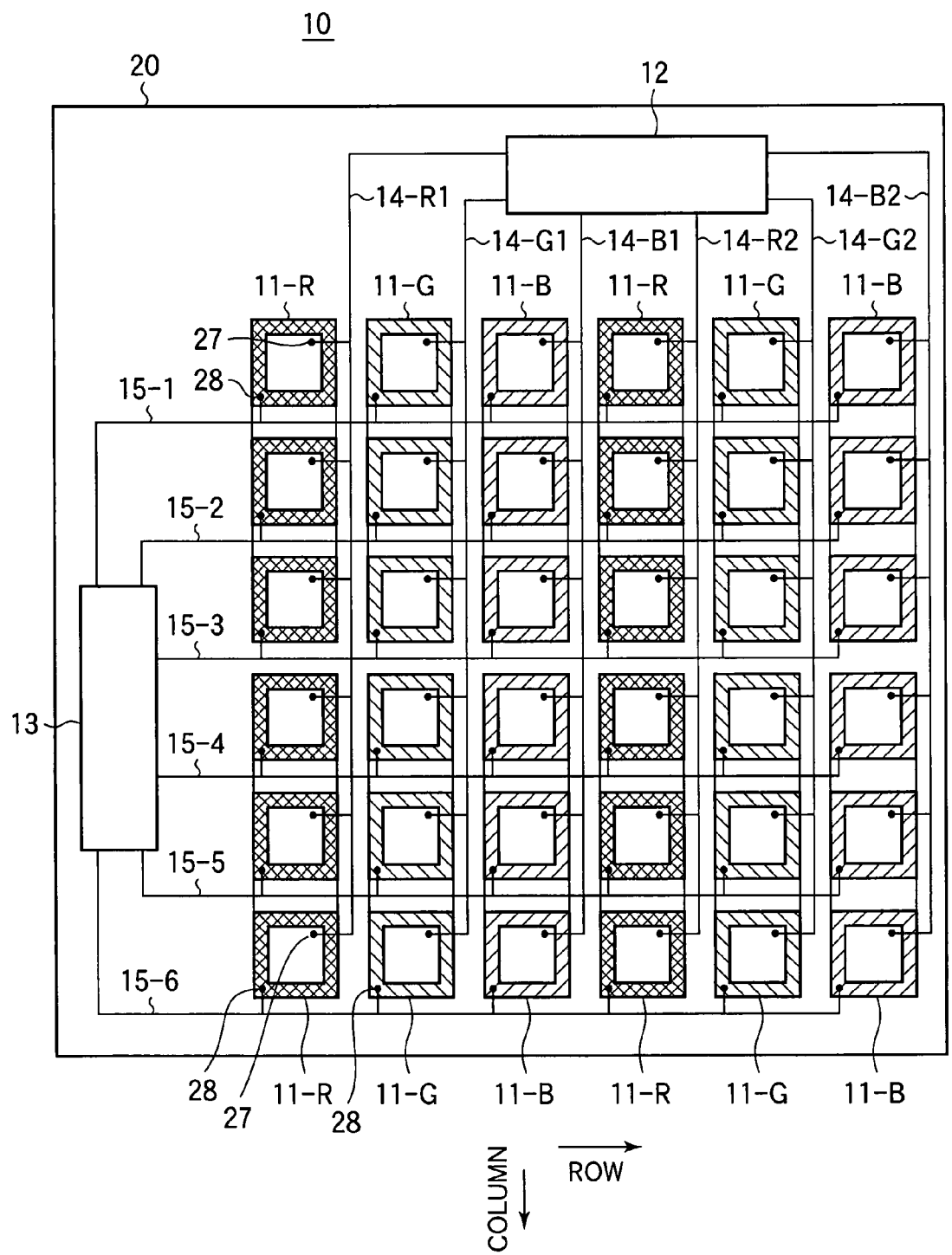
FIG. 6 is a top view of the LED array panel.

FIG. 6 is a top view illustrating the construction of the LED array panel 10.

Referring to FIG. 6, the thin film LED arrays 11-R, 11-G, and 11-B are arranged such that adjacent LEDs in each column emit light of the same color and adjacent LEDs in each row emit light of different colors.

Lines 14-R1, 14-G1, 14-B1, 14-R2, 14G2, and 14-B2 represent anode wirings, and are connected to the anode driver 12 and the p-type side electrodes 27 of the respective LED elements formed on the thin film LED arrays 11.

Lines 15-1 to 15-6 are cathode wirings, and are connected to the cathode driver 13 and the n-type side electrodes 28 of the respective LED elements formed on the thin film LED array 11.

The anode wirings 14 and cathode wirings 15 may be formed of a metal material such as Au or Al, or may be of a stacked thin film structure (e.g., Au/Ni/Ti, Al/Ni/Ti, Au/Ni, or Al/Ni). The anode wirings and cathode wirings may be formed at the same manufacturing stage as the p-type side electrodes 27 and the n-type side electrodes 28.

The operation of a projection display apparatus 100 will be described with reference to FIGS. 2 and 6.

The image signal is received through the image receiving section 8. The image controller 6 temporarily stores as image data into the memory 7. Here, the image data is described as being temporarily stored into the memory 7. Instead, the image signal may be converted directly into the image data and associated control signals, and then outputted to the LED array panel 10.

The image controller 6 reads the image data from the memory 7, and outputs the image data together with the associated control signals to the anode driver 12 and the cathode driver 13.

The shift registers in the anode driver 12 hold the image data for one scanning line. The LEDs corresponding to the one scanning line are aligned from left to right in FIG. 6, and have cathodes connected to a common cathode wiring 15-1. The image data held in the shift registers describes whether a corresponding LED element should be energized to emit light.

Upon having been stored into the shift registers, the image data for one scanning line is transferred from the shift registers to the latch circuits in the anode driver 12.

The cathode driver 13 selects the cathode line 15-1 in accordance with the control signal received from the image controller 6. If a latch circuit of the anode driver 12 holds data that causes a corresponding LED to become ON, the constant current circuit and driver transistors of the anode driver 12 cooperate to cause current to flow from the p-type side electrode (anode) 27 of the LED, through the n-type side electrode (cathode) 28, to the cathode line 15-1, thereby turning on the LED.

The light spots in the respective scanning lines are projected on a line-by-line basis by the projection lens 3 onto the screen 4, thereby forming a single frame of image.

As described above, data for one scanning line is stored and subsequently a cathode line corresponding to an LED to be turned on is selected. This cycle of storage of data and selection of cathode line is repeated until all of the scanning lines in an entire screen have been selected, thereby properly energizing LEDs for the entire screen.

While the LED array panel 10 has been described in terms of LEDs arranged in a matrix of 6 by 6 for simplicity, any number of LEDs may be employed.

In addition, the light emitting surfaces of the thin film LED array 11 may be configured in a variety of ways in shape, aspect ratio, and arrangement. For example, when the LED array panel 10 includes three types of LEDs that emit corresponding colors different from one another (e.g., R, G, B), respectively, the LEDs are preferably arranged such that LEDs of three different colors as a whole occupy a single substantially square area. The shape of light emitting area of each LED may be, for example, diamond or elliptic.

The first embodiment has been described with respect to the thin film LED arrays 11 arranged in a flat plane on the substrate 20. In stead, the thin film LED arrays 11 may be stacked such that the light emitting regions of any thin film LED array are not covered with another thin film LED array 11.

Modification to First Embodiment

Figure 7:
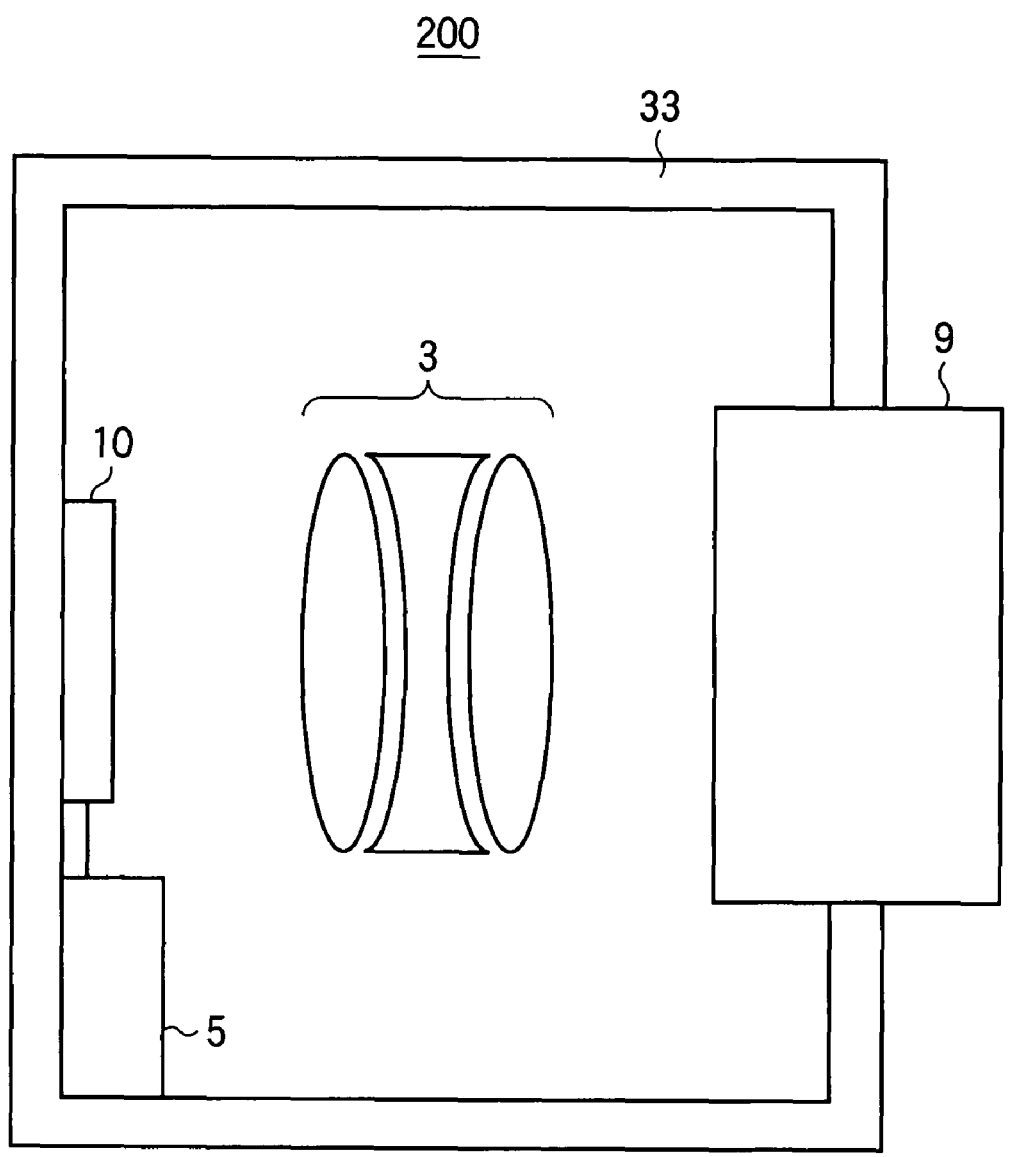
FIG. 7 illustrates a modification to the first embodiment.

FIG. 7 illustrates a modification to the first embodiment. A projection display apparatus 200 differs from the projection display apparatus 100 in that a chassis 33 and a zoom lens 9 are used.

The image formed by the LED array panel 10 is projected through the projection lens 3 and zoom lens 9 onto a screen (not shown) outside of the projection display apparatus 200. This configuration allows an enlarged image to be displayed by adjusting the distance between the projection apparatus 200 and the screen or by adjusting the zooming of the zoom lens 9.

Another Modification to First Embodiment

Figure 8:
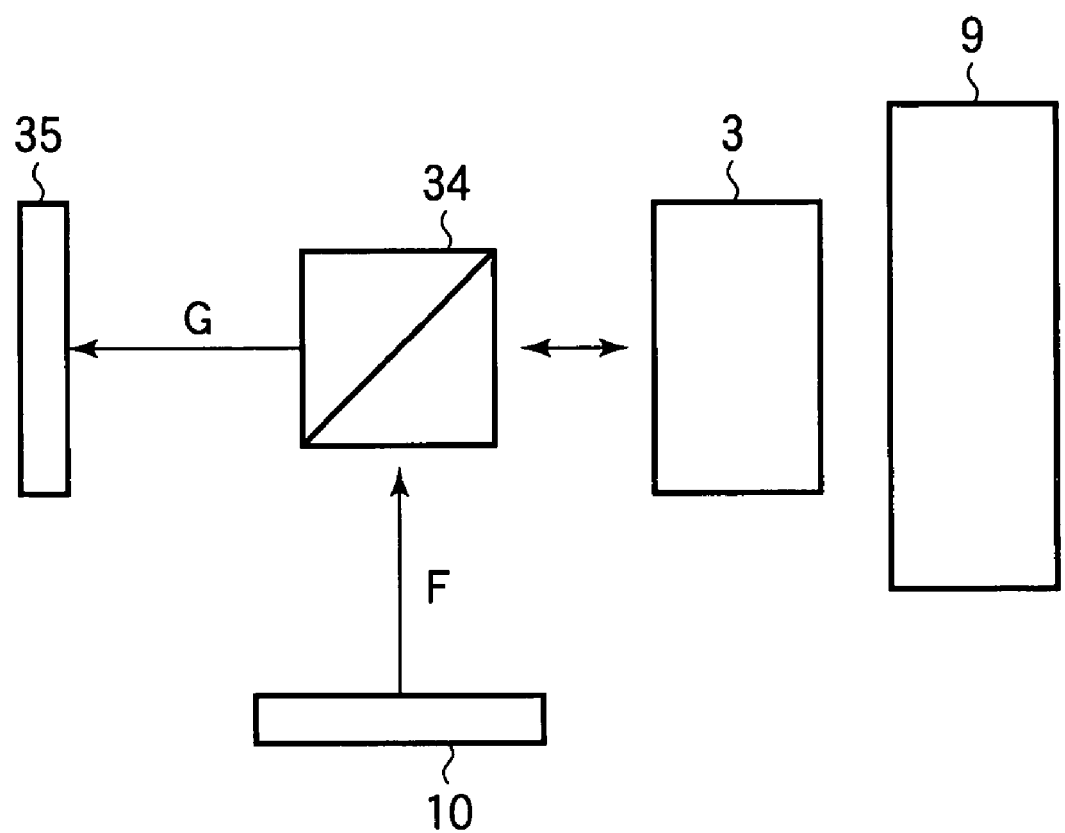
FIG. 8 illustrates another modification to the projection display apparatus.

FIG. 8 illustrates another modification to the projection display apparatus 100.

FIG. 8 omits the chassis for simplicity.

Referring to FIG. 8, a projection display apparatus 300 includes a prism 34 that selects the light path, and a charge coupled device (CCD) 35 that serves as an image pickup device for capturing an image. The prism 34 functions as a half mirror in which incident light is reflected or transmitted depending on the incident direction.

The display function of the projection display apparatus 300 differs from the projection display apparatuses 100 and 200 only in that an image projected in a direction shown by arrow F from the LED array panel 10 is reflected into the projection lens 3 by the prism 34 in a direction substantially perpendicular to the F direction.

An image enters the projection display apparatus 300 through the zoom lens 9, transmits through the projection lens 3, then passes through the prism 34, and is finally incident on the CCD 35. The output of the CCD 35 is stored into a memory (not shown). This memory may be the memory shown in FIG. 2.

As described above, a projection display apparatus including a light path switching section and an image pickup device may be of small construction, and provides the functions of picking up an image and projecting an image.

The image forming section of the first embodiment includes a plurality of light emitting elements two-dimensionally arranged and a driver section that selectively drives the plurality of light emitting elements. An image is formed in the image forming section, and is then projected through the projection lens onto the screen. This type of projection display causes the light sources to emit light only when they are required to emit light, thereby minimizing power consumption of the apparatus.

A plurality of semiconductor thin films are fixedly arranged on a substrate, and each of the semiconductor thin films includes a plurality of LEDs formed therein. The resulting apparatus is an image forming apparatus of thin construction and hi-definition.

Second Embodiment

Figure 9:
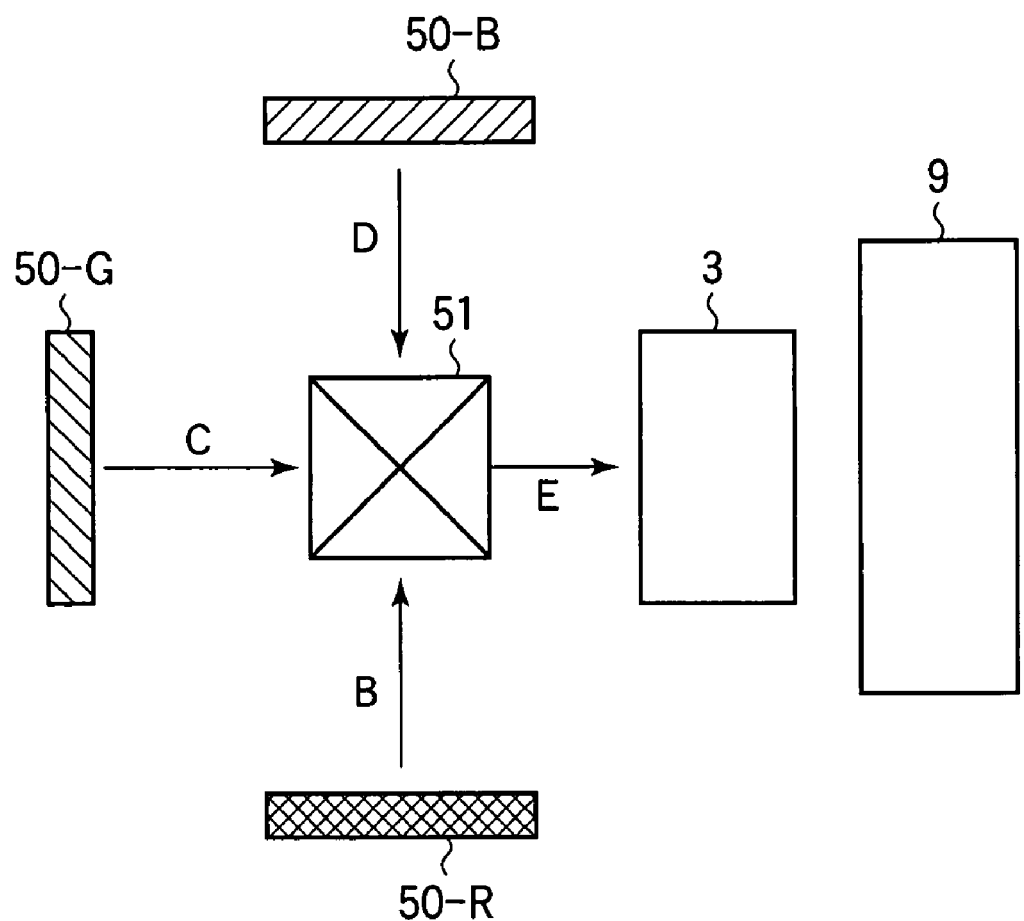
FIG. 9 illustrates the configuration of a projection display apparatus of a second embodiment.

FIG. 9 illustrates the configuration of a projection display apparatus 400 of a second embodiment. For simplicity's sake, a chassis is not depicted in FIG. 9.

LED array panels 50-R, 50-G, and 50-B incorporate LEDs for emitting red, green, and blue light, respectively.

A prism 51 serves as an image synthesizing means, and synthesizes the images emitted from the LED array panels 50-R, 50-G, and 50-B into a single full color image before outputting the image to the projection lens 3.

A red image is emitted from the LED array panel 50-R, and is incident on the prism 51 in a direction shown by arrow B. The red image is then reflected in a direction shown by arrow E, substantially perpendicular to the B direction.

A green image is emitted from the LED array panel 50-G, and is incident on the prism 51 in a direction shown by arrow C. The green image transmits straight through the prism 51, and enters the prism 3 in the E direction.

A blue image is emitted from the LED array panel 50-B, and is incident on the prism 51 in a direction shown by arrow D. The blue image is then reflected in the E direction, substantially perpendicular to the D direction.

Figure 10:
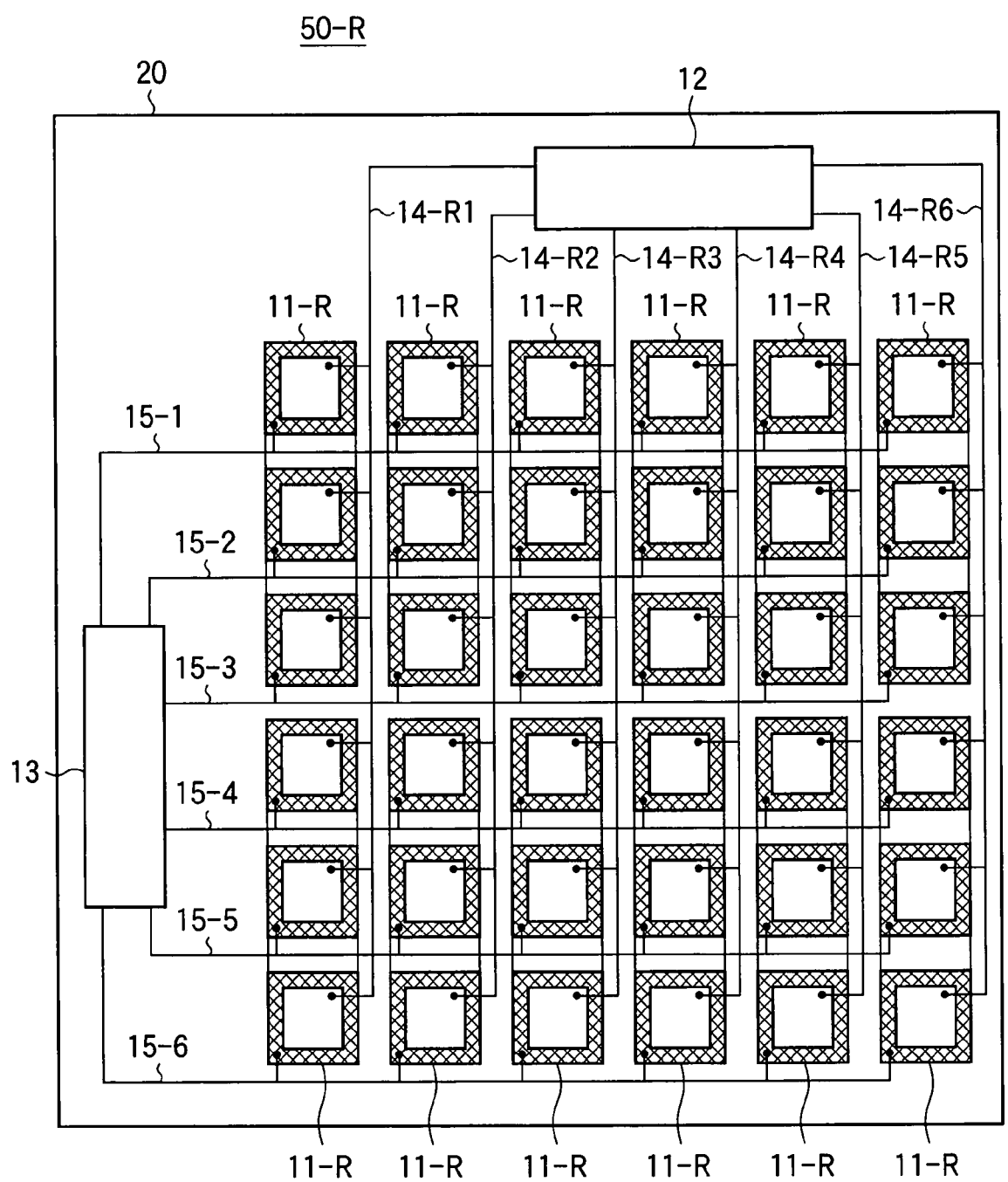
FIG. 10 is a top view illustrating the construction of the red LED array panel.

FIG. 10 is a top view illustrating the construction of the LED array panel 50-R.

The LED array panel 50-R differs from the LED array panel 10 of FIG. 6 in that the thin film LED arrays 11-R fixed on the substrate 20 emits light of a single color (red). The wiring among electrodes, anode driver 12, and cathode driver 13 for the LED array panel 50-R is accomplished in the same manner as the LED array panel 10 of FIG. 6.

Likewise, the thin film LED array 11-G of the LED array panel 50-R emits light of a single color (green), and the thin film LED array 11-B of the LED array panel 50-R emits light of a single color (blue).

The operation of the projection display apparatus 400 will be described with reference to FIGS. 9 and 10.

The projection display apparatus 400 operates in much the same way as the LED array panel 10 of the first embodiment from when image signals are received until images of the respective colors are formed by the respective LED array panels 50-R, 50-G, and 50-B. Thus, a description will be given only of the operation in which the images of the respective colors are synthesized into a single full color image.

The cathode driver 13 is controlled such that the LEDs for one scanning lines (wire 15-1 in FIG. 10) of the LED array panels 50-G and 50-B are energized to light up in synchronism with light emission of LEDs for one scanning line of the LED array panel 50-R.

The images emitted from the LED array panels 50-R, 50-G, and 50-B are synthesized by the prism 51. The synthesized full color image then travels in the E direction. The full color image is then projected through the projection lens 3 and zoom lens 9 onto a screen (not shown).

Subsequently, the cathode wirings 15-2 to 15-6 are selected in sequence, thereby forming an image for one frame.

While the projection display apparatus 400 has been described in terms of LED array panels of three different colors, the LED array panels of two different colors or four different colors may be used, in which case, a dichroic mirror may be conveniently used in place of a prism.

As described above, the projection display of the second embodiment is of the configuration in which a plurality of LED array panels of different colors form images of corresponding colors and then the images are synthesized by an image synthesizing means before being projected onto a screen. This projection display apparatus 400 of the second embodiment provides a high definition color image in addition to the advantages obtained in the first embodiment.

The projection display apparatus of the invention is of a configuration in which a plurality of light emitting elements are two-dimensionally arranged and are selectively driven to emit light that forms an image as a whole. A substantial saving in electric power may be obtained by this configuration.

Semiconductor thin films having a plurality of LEDs are arranged in two-dimensional plane. Such an arrangement allows an image forming apparatus to be miniaturized.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A projection display apparatus including an image forming section that forms an image based on image information received from an external device, and a projection lens that projects the image formed by the image forming section, wherein the image forming section comprises:
    a support substrate;
    an insulating film formed on said support substrate having a first surface in direct intimate contact with a surface of said support substrate and a second surface on a side opposite to the first surface, the second surface being a smoothed surface;
    a plurality of light emitting elements in a form of a semiconductor thin film two-dimensionally arranged on the second surface of said insulating film, the semiconductor thin film being mounted on said insulating film and including a third surface in direct contact with the second surface of said insulating film and a fourth surface on a side opposite to the third surface, said light emitting elements including first electrodes formed on the fourth surface and second electrodes formed on the fourth surface, wherein said plurality of light emitting elements include rows of light emitting elements and columns of light emitting elements such that the rows are substantially perpendicular to the columns;
    a first driver element that selectively drives the rows;
    a second driver element that selectively drives the columns;
    first wirings that electrically connect said first driver element to the first electrodes of said light emitting elements, said first wirings being formed on the fourth surface; and
    second wirings that electrically connect said second driver element to the second electrodes of said light emitting elements, said second wirings being formed on the fourth surface.

2. The projection display apparatus according to claim 1, wherein said image forming section includes a cooling section that cools said plurality of light emitting elements.

3. The projection display apparatus according to claim 2, further comprising a screen that includes a front surface and a rear surface, wherein said projection lens projects the image onto the rear surface and an observer observes the image formed on the front surface.

4. The projection display apparatus according to claim 1 wherein said image forming section is one of a plurality of image forming sections, each image forming section including a plurality of light emitting elements that emit light of the substantially the same wavelength such that each image forming section forms an image of a different wavelength from remaining ones of the plurality of image forming sections; and
    wherein the projection display apparatus further comprises an image synthesizing section that combines images formed by the plurality of image forming sections into a single image.

5. The projection display apparatus according to claim 4, further comprising a screen that includes a front surface and a rear surface, wherein said projection lens projects the image onto the rear surface and an observer observes the image formed on the front surface.

6. The projection display apparatus according to claim 1, wherein said plurality of light emitting elements include three groups of light emitting elements, each group including a plurality of light emitting elements aligned either in the rows or in the columns, each group emitting light of a different wavelength from the remaining groups.

7. The projection display apparatus according to claim 6, further comprising a screen that includes a front surface and a rear surface, wherein said projection lens projects the image onto the rear surface and an observer observes the image formed on the front surface.

8. The projection display apparatus according to claim 1, further comprising a screen that includes a front surface and a rear surface, wherein said projection lens projects the image onto the rear surface and an observer observes the image formed on the front surface.

9. The projection display apparatus according to claim 1, wherein said plurality of light emitting elements are light emitting diodes formed in the form of semiconductor thin films of stacked structure, each semiconductor thin film including a number of light emitting diodes isolated from one another, the semiconductor thin films being bonded to said substrate by intermolecular force.

10. The projection display apparatus according to claim 1, further comprising:
    an image pickup device;
    a light-path switching section that directs the image formed in the image forming section to said projection lens and that directs an image entering through said projection lens from outside of the apparatus to said image pickup device.

11. An image forming apparatus comprising:
    a substrate;
    a plurality of semiconductor thin films each of which includes a predetermined number of light emitting diodes isolated from one another, said plurality of semiconductor thin films being bonded by intermolecular force over said substrate such that the light emitting diodes are two-dimensionally arranged, the semiconductor thin films including a first surface in direct contact with said substrate and second surface on a side opposite to the first surface, said light emitting elements including first electrodes formed on the second surface and second electrodes formed on the second surface, wherein said plurality of light emitting diodes include rows of light emitting diodes and columns of light emitting diodes such that the rows are substantially perpendicular to the columns;
    a first driver element that selectively drives the rows;
    a second driver element that selectively drives the columns;
    first wirings that electrically connect said first driver element to the first electrodes of said light emitting elements, said first wirings being formed on the second surface; and second wirings that electrically connect said second driver element to the second electrodes of said light emitting elements, said second wirings being formed on the second surface.

12. The image forming apparatus according to claim 11, wherein said plurality of semiconductor thin films include a plurality of groups of semiconductor thin films, each group including light emitting diodes that emit light of a wavelength different from the remaining groups; and wherein adjacent groups emit light of different wavelengths from one another.

13. The image forming apparatus according to claim 11, wherein said plurality of semiconductor thin films are first formed on a base with a sacrificial layer formed between the base and said plurality of semiconductor thin films, and then the sacrificial layer is etched away so that said plurality of semiconductor thin films are separated from the base and are then bonded to said substrate.

14. An image forming apparatus, comprising:

a substrate;

a plurality of semiconductor thin films each of which includes a predetermined number of light emitting diodes isolated from one another, said plurality of semiconductor thin films being bonded by intermolecular force over a surface of said substrate such that the light emitting diodes are two-dimensionally arranged, the semiconductor thin films including a first surface in direct contact with said substrate and second surface on a side opposite to the first surface, said light emitting elements including first electrodes formed on the second surface and second electrodes formed on the second surface, wherein said plurality of light emitting elements include rows of light emitting elements and columns of light emitting elements such that the rows are substantially perpendicular to the columns;

a first driver element that selectively drives the rows;

a second driver element that selectively drives the columns;

first wirings that electrically connect said first driver element to the first electrodes of said light emitting elements, said first wirings being formed on the second surface; and second wirings that electrically connect said second driver element to the second electrodes of said light emitting elements, said second wirings being formed on the second surface.

15. The image forming apparatus according to claim 14, wherein said plurality of semiconductor thin films include a plurality of groups of semiconductor thin films, each group emitting light of a wavelength different from the remaining groups;

wherein adjacent groups of semiconductor thin films emit light of different wavelengths from one another.

16. The image forming apparatus according to claim 14, wherein said plurality of semiconductor thin films are first formed on a base with a sacrificial layer formed between the base and said plurality of semiconductor thin films, and then the sacrificial layer is etched away so that said plurality of semiconductor thin films are separated from the base and are then bonded to said substrate.

* * * * *